United States Patent [19]

Gill

[11] 3,861,487
[45] Jan. 21, 1975

[54] ELECTRIC POWER MEANS FOR VEHICLES
[76] Inventor: Walter L. Gill, 225 S. Buena Vista, Redlands, Calif. 92373
[22] Filed: June 27, 1973
[21] Appl. No.: 374,127

Related U.S. Application Data
[63] Continuation-in-part of Ser. No. 360,959, May 16, 1973.

[52] U.S. Cl. .................. 180/65 R, 115/5, 290/42, 290/53, 320/61
[51] Int. Cl. ....................... B60k 25/10, B60l 11/00
[58] Field of Search ............... 180/65 R; 115/4, 5; 320/61; 290/42, 43, 53, 54

[56] References Cited
UNITED STATES PATENTS

| 1,557,570 | 10/1925 | Eckman et al. | 180/65 R UX |
| 1,562,903 | 11/1925 | Miller | 180/65 R |
| 3,507,580 | 4/1970 | Howard et al. | 320/61 UX |
| 3,527,188 | 9/1970 | Shepard et al. | 115/4 |
| 3,774,048 | 11/1973 | Hardingham | 115/4 X |

FOREIGN PATENTS OR APPLICATIONS

| 225 | 1898 | Great Britain | 115/4 |

Primary Examiner—Kenneth H. Betts
Assistant Examiner—Milton L. Smith
Attorney, Agent, or Firm—Dwight H. Smiley; Imirie, Smiley & Linn

[57] ABSTRACT

A vehicle power system comprises a power generating unit carried by a vehicle for reaction to movements between parts of a vehicle to produce energy that is transmitted through a power reserve unit to electric generating means for translation into electrical energy which augments the battery power pack that supplies current for an electric system on such vehicle.

10 Claims, 15 Drawing Figures

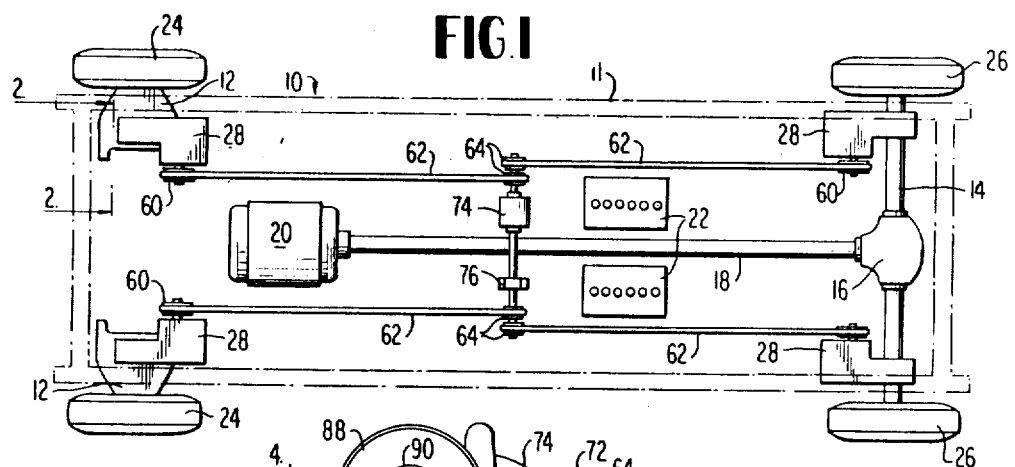
FIG.1
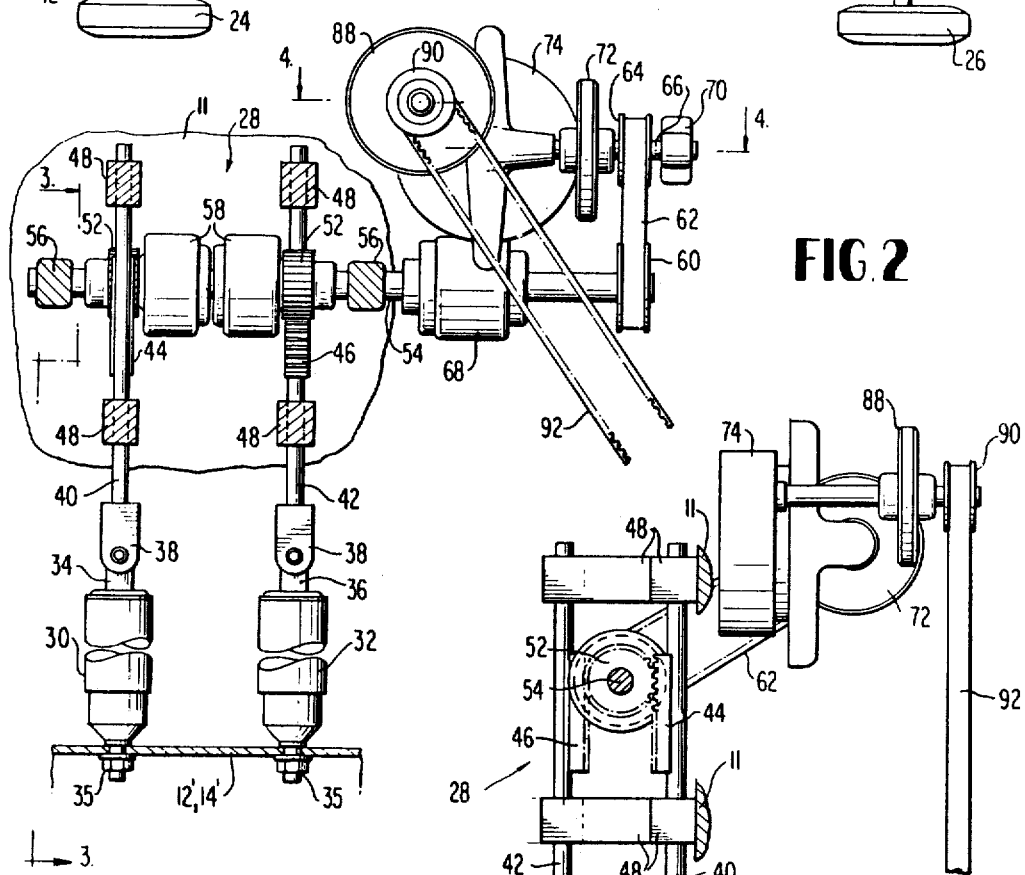
FIG.2
FIG.3

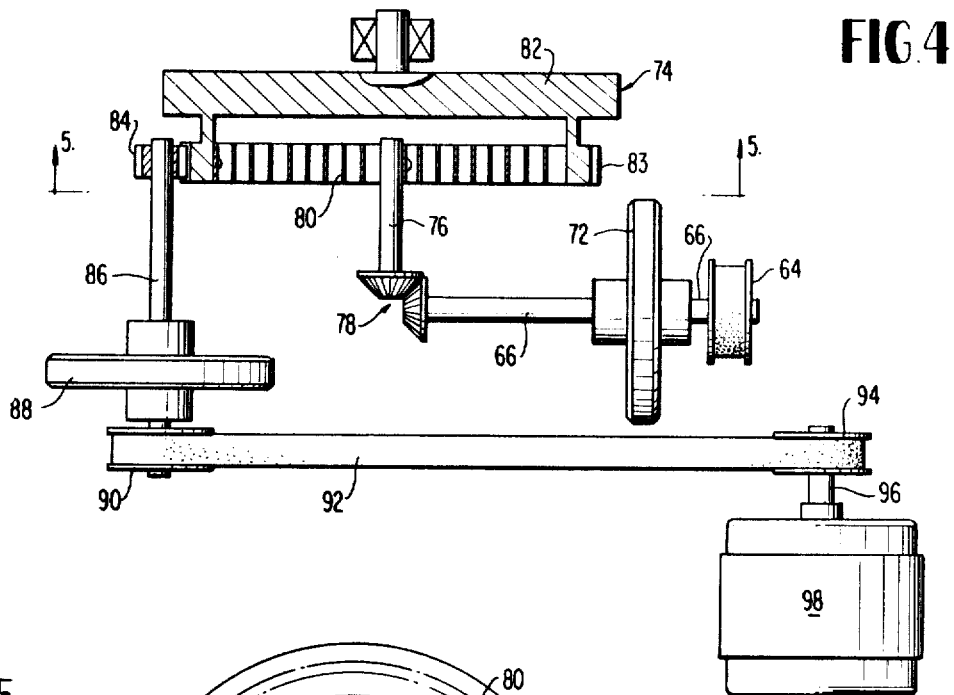
FIG.4
FIG.5
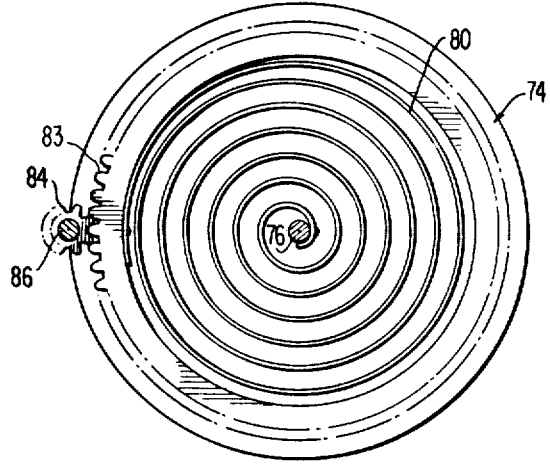
FIG.6

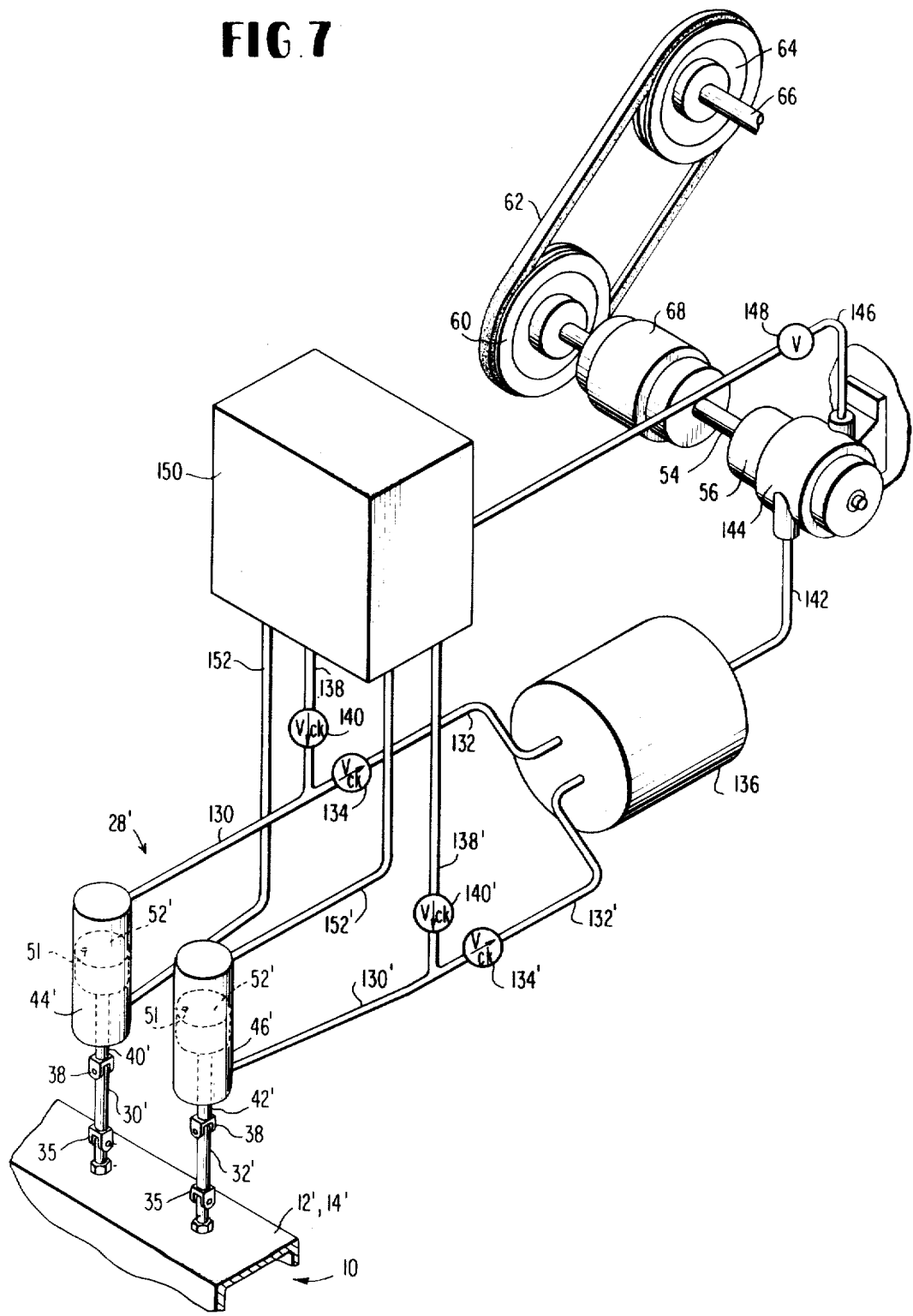

ELECTRIC POWER MEANS FOR VEHICLES

CROSS-REFERENCE TO RELATED APPLICATION

This application is a continuation-in-part of application Ser. No. 360,959, filed May 6, 1973.

BACKGROUND OF THE INVENTION

1. Field of the Invention

The present invention generally appertains to novel improvements in electric power generating means for vehicles, whether of a land, sea or air nature and more particularly is directed to new and novel improvements in augmenting electrical power for systems carried by such vehicles.

2. State of the Prior Art

The state of the economy and the condition of the ecology have sparked renewed interest in power means for vehicles that do not require petroleum products or gases for their operation. The rising costs and predicted shortages of gasoline and oil and natural gas, on the one hand, and the air pollution problem, on the other hand, are the economical and ecological factors that have given impetus to fresh attempts to produce vehicles driven by electrical energy. In addition, it is desirable to extend the life of electric supply means for all vehicle-borne electric systems.

Back in the infancy of automotive vehicles, as one example, many efforts were expended to power the vehicles with electric motors. While there were some isolated and spasmodic successes, most of the efforts were doomed to failure because of the unsolved problem of storing sufficient energy in the batteries carried by the vehicles. It became a matter of battery pack size versus the size of the vehicle frame and chassis. And, at best, any compromise solution resulted in a restricted range of operation of the vehicle. This was a direct result of limited storage capacity of the batteries. But there were other resultant factors of inadequate speed and power.

With the oncoming petroleum crises and the polluting exhausts from gasoline engines, attention has been given anew to solving the earlier encountered problem of restricted vehicle range and large battery packs. Batteries of larger storage capacity have been produced. Energy cells of a smaller and more technologically sophisticated nature have been developed. More efficient utilization of the electrical energy has been considered.

Such recent innovations have been somewhat useful but they have not solved the basic problem of limited range of electrically powered vehicles or the limited operational period of electric systems of all types carried by vehicles. At least they have not solved the problem within an economically feasible framework and within a technological area that leads itself to any practical degree of mass production.

SUMMARY OF THE INVENTION

The present invention serves to augment the storage battery for the electric drive motor or other electric system of a vehicle by capturing and utilizing the physical movements of the vehicle, whether of a land, sea or air type, and, in so doing, to increase the range, speed and power of such vehicle or system carried thereby without increasing the physical size of the storage battery or similar energy cells. In the instance of land vehicles, it can be appreciated that the body frame and chassis are jolted and shocked as the ground engaging wheels travel over the terrain even though the latter appears to be relatively smooth. For this reason many types of spring assemblies and shock absorbers are in use to soften the reaction between the wheels and frame but they fail to utilize such physical movements which are a potential source of energy. The present invention utilizes such energy and converts it into a working energy for supplying electrical energy for the electric drive motor of the vehicle.

In accordance with the present invention, mechanical power generating units are attached to and actuated by an automotive vehicle, for example, in its travel over the supporting medium whether ground, water or whatever it may be. Such units are between relatively movable parts of the vehicle and respond to gravity and to the bounces and jolts of at least one part of the vehicle. Each power generating unit has a pair of complemental rectilinearly reciprocating members which may operate mechanical means, such as rack bars meshed with one way drive pinion means on a shaft which is connected by a drive transmission means to a reserve power unit, or hydraulic means, such as pump pistons for supplying fluid under pressure to a hydraulic motor which drives a shaft connected with the power reserve unit. Power is stored in the reserve unit, from which power is transferred to an alternator or generator in circuit with the battery group for an electric drive motor for the vehicle. The rack bars or piston rods may be anchored to one part of the vehicle and the pinion means or pump cylinders to another part to convert reciprocal movement between such parts to a rotary power drive.

The reserve power unit may be a spring means or a hydraulic or an electrical arrangement that is powered by the mechanical rotary drive derived from the reciprocal movement of the rack bars relative to the pinion means which includes one-way clutches for driving the power input shaft for the reserve power unit through the drive transmission means, which may include a gear train such as sprockets and a chain or pulleys and a belt. Electrical connections are made from the alternator or generator to a voltage regulator and to an ampmeter, and then to the battery group and through a rheostat to the electric drive motor. The electric drive motor may be coupled to a drive shaft and through a conventional differential on the rear axle of an automotive land vehicle.

The present invention is equally applicable to newly constructed vehicles or as a replacement for the power means of an existing vehicle. It can be installed in virtually all present-day automobiles simply by removing the present engine, transmission, muffler, tail pipe and similar non-essential parts and replacing them with a storage battery pack, electric drive motor connected to the drive shaft and the power generating units mounted on the axles along with the power reserve unit.

While the invention has particular usefulness in connection with an automotive land vehicle, the term vehicle is used in its broadest sense to encompass any land, air or water borne carrier, whether of a mobile type, such as an automobile or both, or of a non-mobile such as a float, buoy or the like. In the latter respect it is particularly advantageous because it is virtually fire and explosion proof. In water vehicles, the power generating units are mechanically connected to and operatively reciprocated in their engagement with the power transmission means by paddles, floats, or similar components, that are responsive to movements of the water itself. In this regard, even when the boat is anchored or docked, the paddles or other means will be reactive to the rise and fall of the water so as to actuate the power generating unit. Moreover, one of the reciprocating parts may comprise inertia means such as a pendulum, which operates freely in response to gravity and like forces.

BRIEF DESCRIPTION OF THE DRAWINGS

FIG. 1 is a plan view of the frame of an automotive vehicle and depicts the electrical power generating units of the present invention in attachment to the axles of the vehicle with a power generating unit being positioned adjacent each wheel of the vehicle;

FIG. 2 is a longitudinal, vertical sectional view taken substantially on line 2—2 of FIG. 1 and shows in side elevation one of the power generating units including a mechanically operated system;

FIG. 3 is a frontal elevational view of the power generating unit, shown in FIG. 2;

FIG. 4 is a sectional view taken substantially on line 4—4 of FIG. 2 and shows in section one form of power reserve unit to which each of the power generating units is attached;

FIG. 5 is a sectional view taken on line 5—5 of FIG. 4 and depicts in frontal elevation the operational interior of the power reserve unit;

FIG. 6 is a schematic showing of the connection of the power reserve unit to the battery group which supplies the electrical energy for the electric motor that drives the wheels of the vehicle through a conventional differential as shown in FIG. 1;

FIG. 7 is a diagrammatic perspective view of a hydraulically operated system for a power generating unit according to the invention;

DETAILED DESCRIPTION OF THE PREFERRED EMBODIMENTS

Figure 10:
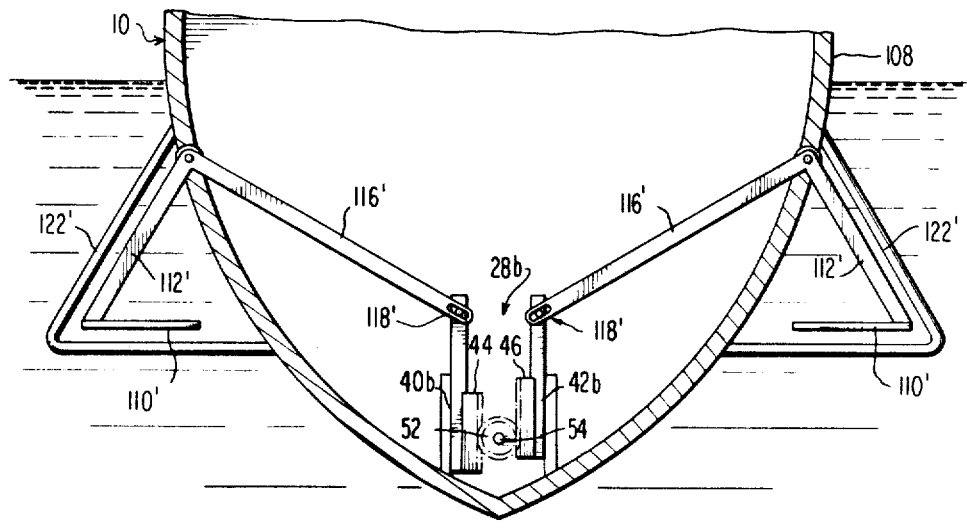
FIG. 10 is a view similar to FIG. 8 but showing a modification.

Referring now more particularly to the accompanying drawings, and initially to FIG. 1, the skeleton of an automotive vehicle 10 comprises a body frame 11 supported in the usual manner by springs or the like mounted on a front axle 12 and a rear axle 14 and provided with a differential 16 connecting a drive shaft 18 with the rear axle 14 in a conventional manner. The shaft 18 is powered by an electric motor 20 which is supplied with electrical energy from a battery group 22 supported in any suitable manner on the frame 11. Front steerable wheels 24 are provided in a normal fashion on the front axle 12 and rear drive wheels 26 are provided in an usual assembly on the rear axle 14.

According to the invention, the relative movement between the frame and at least one point on the axles is employed as a source of energy for regenerating the battery group, such movement, in the present instance, occurring during travel of the vehicle. For this purpose, a power generating unit 28 preferably is mounted on a part of at least one of the axles 12 and 14 preferably adjacent each of the wheels on such axles if a plurality of such units are employed. Each of the power units is identical in construction and one such unit is shown in greater detail in FIGS. 2 and 3, as associated with cylinders similar to the usual shock absorbers although, obviously, the power units, may, and probably will, be connected directly between the axles and frame.

As shown in FIGS. 2 and 3, each power unit 28 is connected between a selected point of an axle and of the frame, and, in the present instance, is shown as connected with a pair of single acting cushioned cylinders 30 and 32, similar to the usual shock absorbers, which are mounted in a side by side arrangement with their closed ends fixed by fastening means 35 to the axle housings 12',14'. The opposite ends of the cylinders respectively are connected by a clevis or universal joint 38 to elongated members such as power rods 40 and 42. The connections 35 and 38 may both be universal so that the cylinders 30 and 32 can function as links to accommodate lateral movement. The power members are provided on their inwardly directed faces with racks 44 and 46 which are in confronting relation, as shown in FIG. 2, but which are laterally spaced to cooperate with the opposite sides of the peripheries of pinions 52 coaxially mounted on a shaft 54, as shown in FIG. 3. The power rods are slidably mounted in bearing sleeves 48 which may be secured to the body frame to support the rods in fixed relation to the pinions 52.

Each pinion 52 is connected with the shaft 54 by a one-way or over-running clutch 58, the shaft 54 being rotatably journaled in appropriate bearings 56 that are fastened to any suitable part of the automotive frame 11. As each power rod is reciprocated its rack oscillates the respective pinion but the clutches 58 have unidirectional drive and alternately are effective to continuously drive the shaft 54 in the same direction. The two power rods are required, one being a left-hand and the other being a right-hand as shown in FIG. 3, for uninterrupted rotation of the shaft 54 to insure continuous rotation of the shaft in the same direction.

The inner end of the shaft is provided with a pulley or sprocket 60 that is connected by a belt or chain 62 to a pulley or sprocket 64 on a parallel shaft 66, an over-running clutch 68 being provided on the shaft 54 inwardly of the pulley 60 to prevent overload. The shaft 66 is supported in suitable bearings 70 and is provided with an adjustable torque brake 72 that is a one-way slip clutch to prevent overdriving of the power reserve unit 74. The shaft 66, as shown in FIG. 4, is drivingly connected with an input shaft 76 of the power reserve unit 74 by meshing bevel gears 78. One form of power reserve unit 74 is shown in FIG. 4 as including a leaf spiral spring 80 supported by a frame 82 and drivingly connected by an integral ring gear 83 and pinion arrangement 84 to a power output shaft 86. The power output shaft 86 is provided with an adjustable torque brake 88 in the form of a one-way slip clutch and has a pulley or sprocket 90 fixed on its outer end, which is connected by a belt or chain 92 to a pulley or sprocket 94 fixed on the shaft 96 of a conventional alternator or generator 98.

As shown in FIG. 6, the generator 98 is connected by circuitry 100 with a voltage regulator 102, an ampmeter 104, to the battery group 22 and through a rheostat 106 to electric motor 20. The rheostat may be controlled by a foot or hand lever or any other type of control which would be convenient for the driver of the vehicle 10. While each power generating unti 28 may be connected to its own individual power reserve unit, it is preferred that the power generating units be connected to one central power reserve unit 76 as shown in FIG. 1 by means of the belts and pulleys or chains and sprockets.

It is believed that the operation of the power generating units will be quite apparent to those skilled in the art. In this regard, it can be appreciated that any movements of the body frame 11 of the automotive vehicle 10 relative to the wheels 24 and 26 will produce a coordinated reciprocating movement of the power rods 40 and 42 of each power generating unit 28. Such alternating rectilinear movement of the rods will be translated by the engaging racks 44 and 46 and pinions 52 to continuous one-way rotation of the shaft 54. Through the belt or chain drive transmission the shaft 54 will rotate the shaft 66 that, through the connective gearing 78, drives the power input shaft 76 for the power reserve unit 74. The power reserve unit 74 will supply additional power for the electric drive motor 20 and/or battery 22 when the vehicle 10 has stopped, as at a stop signal, or in coasting until the power reserve is depleted. It can be appreciated that the power reserve unit will enable a smaller battery group to be used and will permit the battery group to operate for a considerably longer period of time over a greater distance than with the original charge of the battery 22.

The foregoing embodiment includes a power unit incorporating a mechanically operated system for capturing waste energy and converting reciprocal movement to unitary rotation. The power unit may comprise a hydraulically operated system, as shown in FIG. 7, wherein the unit 28' includes a pair of links 30',32' connected by universal joints 35 with the frame portion 12',14' of a vehicle 10 and by universal joints 38 with power members or rods 40', 42' which constitute piston rods connected with pistons 52' within cylinders 44',46'. In the present instance the cylinders are shown as single acting with the cylinder 44' supplying pressure under fluid through conduit 130 when the piston 52' within the cylinder moves upwardly whereas the piston 52' in cylinder 46' supplies fluid under pressure to conduit 130' on its downward stroke.

The conduits 130, 130' are connected with pressure lines 132, 132' to a pressure tank 136 through check valves 134, 134', respectively, which open only under pressure to supply pressure fluid to the tank 136. In addition, the conduits 130, 130' are connected by lines 138, 138' through one-way check valves 140, 140' that are closed to pressure fluid from the conduits 130, 130' but are open by suction produced by the return strokes of the pistons 52' so that fresh fluid is supplied to the operative compression side of the cylinders from a reservoir 150.

The pressure tank 136 supplies pressure fluid through a line 142 to a fluid driven motor 144 that drives the power shaft 54 that is journaled in bearings 56 and is connected by the overrunning clutch 68 with the pulley or sprocket 60 that drives the belt or chain 62 which is trained around the pulley or sprocket 64 for driving the shaft 66 to the power reserve unit. Fluid from the motor 144 is directed through a line 146 and pressure regulator or reducer valve 148 to the reservoir 150. The non-working ends of the cylinders 44', 46' can be vented to atmosphere but to avoid leakage and maintain a closed circuit, such non-working ends preferably are connected with the reservoir 150 by lines 152, 152' and the pistons 52' may be provided with one-way by-passes 51 so that the fluid drawn into the non-compression sides of the pistons can flow to the opposite sides of the pistons and augment that fluid drawn from the lines 136, 138' during the return stroke of the pistons.

Figure 9:
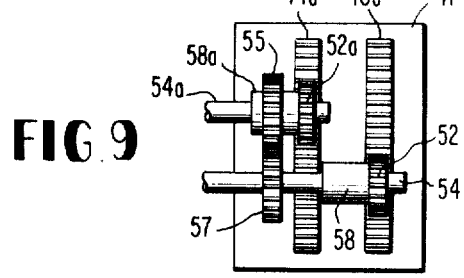
FIG. 9 is a fragmentary view in elevation of the mechanically operated system shown in FIG. 8.
Figure 8:
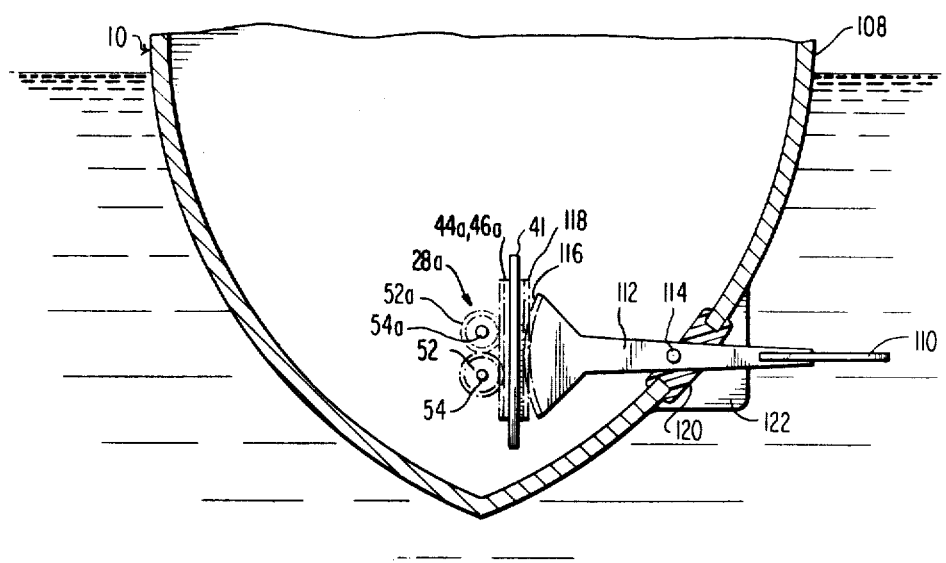
FIG. 8 is a diagrammatic cross-sectional view of a water-borne vehicle incorporating the invention.

The power units 28, 28' of the foregoing embodiments are shown as comprising two power members or rods 40, 42 or 40', 42' but it is obvious, particularly with respect to the hydraulic system of FIG. 7, that the units may comprise single, double-acting members. For example, in FIG. 7, a single cylinder may have the pressure lines 130,130' connected to opposite ends thereof and in this case the auxiliary supply lines 152,152' would be eliminated, supply fluid being drawn exclusively through the lines 138,138'. A similar double-acting mechanical system is shown in FIGS. 8 and 9 wherein a power member 41 carries racks 44a and 46a, or a single wide rack disposed on the same side of the power shaft 54. In this embodiment a pinion 52 and one-way clutch 58 may be mounted on the shaft 54 and meshed with one rack, such as rack 46a, whereas the second pinion 52a is mounted on an auxiliary shaft 54a, parallel with shaft 54, with a one-way clutch 58a that carries a pinion 55 which is meshed with a pinion 57 fixed on the shaft 54. Thus, the rotational direction of drive of the pinion 52a and clutch 58a is reversed through the pinions, 55,57 so that the rotational drive of shaft 54 is uni-directional with that derived from pinion 52 and clutch 58.

The previously described embodiments specifically have referred to the recovery of lost or waste energy derived by the relative movements between one part that engages the supporting medium and another part resiliently supported thereby such as the ground engaging wheels and body chassis of a land vehicle or of the buoyant hull or pontoon and a load-supporting body resiliently carried by the buoyant portion such as in water-borne hydroplane type vehicles. Moreover, the description has been directed to the use of such energy as the source of an auxiliary electric current supply for an electric motor power drive for propelling such vehicles. Clearly the invention may advantageously be employed for producing auxiliary electric current supply for any type of electric system such as lighting, communications and the like. Moreover, the energy may be recovered from relative movements between the surrounding or supporting medium or through inertia responsive means.

An example of means responsive to the environment is illustrated in FIGS. 8 and 10 wherein the vehicle 10 is shown as comprising the hull 108 of a boat, pontoon, float, buoy or the like and wherein energy is derived from the relative movement of and within the water surrounding the vehicle. As shown in FIG. 8 the energy capturing element may comprise a paddle or float 110 secured to the outboard end of a lever 112 supported by a pivot 114 carried by the hull 108, the opposite inboard end of the lever 112 carrying a gear segment 116 that meshes with a rack 118 secured to the power member 41 of the double-acting unit 28a. The lever is shown as extending through the hull through a water-tight fitting 120 and is protected by a shield 122.

FIG. 10 illustrates the application of the foregoing principle to a dual single acting unit 28b wherein the racks 44 and 46 are disposed in confronting relationship on opposite sides of a pair of pinions 52 mounted on the shaft 54. In this instance the racks are carried by power members 40b, 42b which are connected by pins and slot connections 118' to the inboard ends 116' of a pair of levers 112' carrying paddles or floats 110'. The levers are mounted on pivots 114' carried by the hull 108 of a vehicle 10. The levers pass through the hull and are sealed by watertight fittings 120'. Guards 122' secured to the outside of the hull protect the levers 112' and paddles 110' from damage.

As previously stated the energy capturing means may be inertia responsive and this means may constitute the prime source of energy development or an auxiliary source which can be used in conjunction with one of the previously described embodiments. It is particularly advantageous because it can be of relatively small compass and can readily be mounted on any type of vehicle, any part of which is subject to movement of various types, such as aircraft, buoys, or the like.

Figure 11:
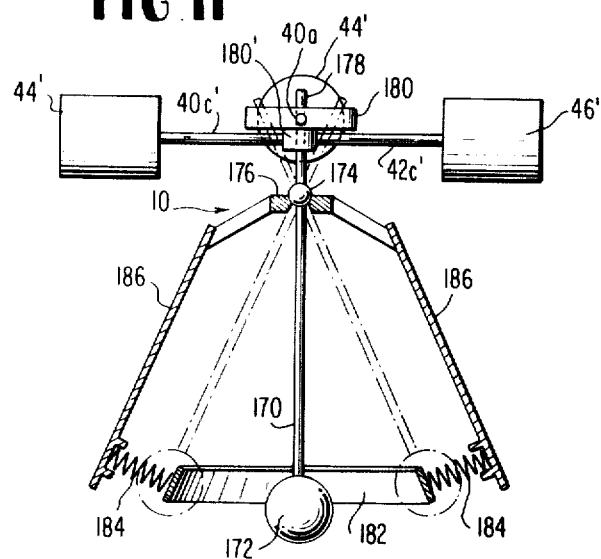
FIG. 11 is a diagrammatic side view in elevation, partially in cross-section, of an inertia responsive energy developing system.
Figure 12:
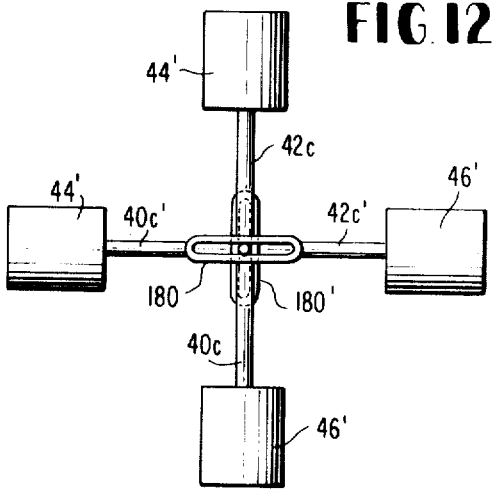
FIG. 12 is a fragmentary plan view of FIG. 11.

One embodiment of energy responsive means is shown in FIGS. 11 and 12 as comprising a pendulum 170 carrying a weight 172 and suspended by a universal joint 174 from a portion 176 of a vehicle 10. The pendulum is shown as comprising an extension 178 above the universal joint and surrounded by two independent scotch yokes 180,180' disposed at right angles and fixed respectively with perpendicularly extending power members 40c, 42c and 40c', 42c' which are shown as constituting piston rods for cylinders 44',46' although it will be understood that a mechanical system can be substituted for the cylinders. Preferably cushion means 182 is provided for engagement by the weight 172 and in this embodiment such means can comprise a ring engaged with and supported by springs 184 carried by members 186 supported by the vehicle portion 176. The pendulum arrangement is particularly effective because movement of the pendulum in any direction other than that exactly parallel with the power rods will operate both of the power producing systems.

Figure 13:
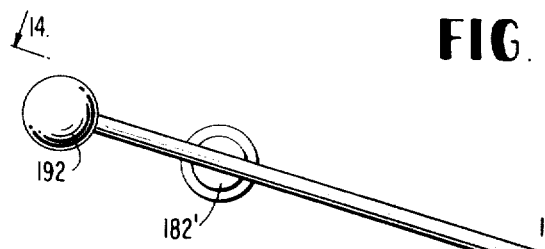
FIG. 13 is a diagrammatic side view in elevation, partially in section, of another inertia responsive system.
Figure 14:
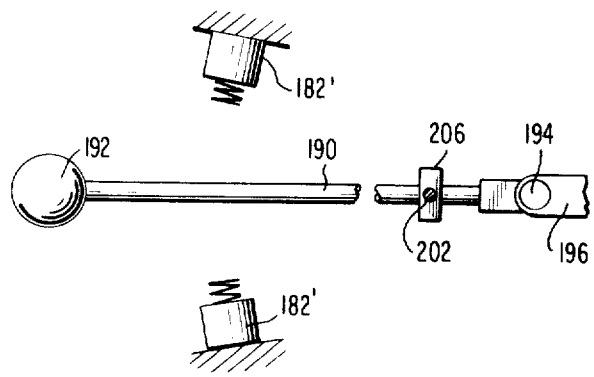
FIG. 14 is a plan view taken on line 14—14 of FIG. 13.
Figure 15:
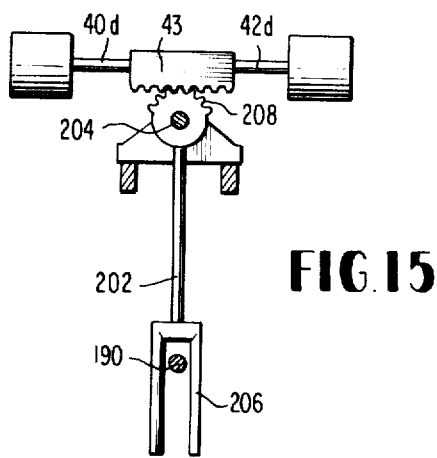
FIG. 15 is a cross-sectional view taken on line 15—15 of FIG. 13.

Another embodiment of the inertia responsive means is shown in FIGS. 13-15 as comprising a lever 190 carrying a weight 192 on its free end and mounted at its opposite end on a pivot 194 supported on a generally upright axis by a bracket 196 secured to a portion 198 of a vehicle 10. Cushioning means 182' may be disposed on opposite sides of the lever to limit its stroke of movement. A second lever 202 is suspended from a pivot 204 whose axis is substantially parallel with the plane of movement of the lever 190 and the lever 202 is provided at its lower end with a fork 206 straddling the lever 190. The lever 202 is fixed at its upper end with a gear segment 208 that is meshed with a rack 43 fixed with power rods 40d, 42d which are shown as piston rods, but obviously may operate further racks meshed with pinions having one-way clutches for driving a power shaft.

The embodiments of the invention shown in FIGS. 8 and 10-15 are particularly advantageous with respect to water borne vehicles because they will function not only during movement of the vehicles, if they are propelled, but also while such vehicles are anchored or tied up at dock. This is because the supporting medium, that is water, seldom is still but is highly influenced by environmental surroundings as well as astronomical, atmospheric and terrestial conditions, and any movement of the water will cause the invention to operate. Thus, the electric power substantially constantly is being replenished. Moreover, the use of electric power eliminates the major safety hazards of fire and/or explosion which can be disastrous on the water.

While the best known forms of the present invention have been shown in the accompanying drawings and described herein, other forms can be realized and changes may be made as come within the scope and spirit of the appended claims.

The embodiments of the invention in which an exclusive property or privilege is claimed are defined as follows:

1. A vehicle provided with means for supporting said vehicle for movement over a supporting medium and adapted to carry an electric system and a battery for powering such system, said vehicle comprising two relatively reciprocatory parts, means supporting one said part from the other said part for enabling relative movement therebetween along at least two different non-colinear paths, means connected between such parts for converting such relative movement into rotary mechanical power, power reserve means receiving and storing said rotary mechanical power, and current generating means for recharging said battery and driven by said power reserve means.

2. A vehicle according to claim 1 wherein said vehicle is a land vehicle and said supporting medium is the ground, said electric system including means for propelling said vehicle.

3. A vehicle according to claim 1 wherein said vehicle is a water borne vehicle and said supporting medium comprises water, said electric system including means for propelling said vehicle.

4. A vehicle according to claim 1 wherein said vehicle comprises a carrier part and an inertia operated part movably supported by said carrier part.

5. A vehicle according to claim 4, wherein said inertia operated part comprises a pendulum.

6. A vehicle according to claim 5 wherein said pendulum is attached to said carrier part by a ball joint enabling said pendulum to swing freely in any direction; and wherein said means connected between such parts includes a universal joint.

7. A vehicle according to claim 1 wherein said converting means comprises a mechanical system.

8. A vehicle according to claim 1 wherein said converting means comprises a hydraulic system.

9. A vehicle provided with means for supporting said vehicle for movement over a supporting medium and adapted to carry an electric system and a battery for powering such system, said vehicle comprising two relatively reciprocatory parts, means supporting one said part from the other said part for pivotal movement therebetween, one of said parts comprising a frame and the other of said parts comprising a pendulum, lever means coupled to said pendulum for converting reciprocatory movement thereof to rectilinear movement, means converting said rectilinear movement into rotary mechanical power, power reserve means receiving and storing said rotary mechanical power, and current generating means for recharging said battery and driven by said power reserve means.

10. A vehicle according to claim 9 wherein said lever means comprises a rod having a bifurcated end coupled to said pendulum, the other end of said rod pivotally disposed on said frame and forming a pinion for cooperation with a rectilinearly movable rack.

* * * * *